United States Patent Office 3,641,177
Patented Feb. 8, 1972

---

3,641,177
ALKYLATION OF AROMATIC HYDROCARBONS
Paul E. Eberly, Jr., and Charles N. Kimberlin, Jr., Baton Rouge, La., assignors to Esso Research and Engineering Company
No Drawing. Filed Nov. 26, 1969, Ser. No. 880,367
Int. Cl. C07c 3/52
U.S. Cl. 260—671 C
9 Claims

ABSTRACT OF THE DISCLOSURE

Process for alkylation of aromatic hydrocarbons with olefins by liquid phase reaction in the presence of a crystalline aluminosilicate zeolite catalyst activated in a particular manner.

---

Alkylated aromatic hydrocarbons boiling in the naphtha range are capable of imparting a high degree of antiknock capability when they are blended into gasolines. Alkylated aromatics are also in demand for use in the petrochemical and chemical industries.

Aromatic alkylation is a catalytic reaction and strong liquid acids are generally used to provide the necessary carbonium ions. The prior art catalysts are corrosive and do not provide high yields of alkylate. It has been suggested in recent literature and patents that solid crystalline aluminosilicate zeolite catalysts may be effective for alkylation of aromatics with olefin hydrocarbons. This approach would provide a simplified process characterized by ease of product separation—see U.S. Pat. No. 2,904,607 issued Sept. 15, 1959.

We have found that the activity of zeolite catalysts for alkylation can be improved by employing a particular treating or activation technique. Briefly stated, the treating comprises the sequential steps of (a) removing sodium or other alkali metal ions from the zeolite by exchange, (b) steaming, (c) reexchanging and (d) calcining. Catalysts treated in this manner are exceptional alkylation catalysts. Further details of the invention are included in the following description and examples.

Suitable crystalline aluminosilicate zeolites that can be treated to provide active catalysts include natural and synthetic materials having a pore size in the range of 5 to 15 A. within an ordered internal structure. The preparation of synthetic zeolites is well documented in the prior art—see U.S. Pat. No. 2,971,903 and/or Re. Pat. No. 26,188, for example. Suitable natural crystalline zeolites are exemplified by the minerals faujasite and mordenite. Synthetically prepared zeolites are preferred in the present invention and they are exemplified by such materials as synthetic faujasite, synthetic mordenite, zeolite X, zeolite Y, zeolite L and the like. Usually the zeolites are prepared in the alkali metal (sodium) form and they are rendered more active by ion-exchange with polyvalent cations such as calcium, magnesium, zinc, rare earth metals and the like. Ion exchange with ammonium ions followed by thermal treatment provides a crystalline aluminosilicate in the hydrogen form. The most preferred activated zeolites for use in the alkylation process of the invention are hydrogen faujasite and rare earth faujasite. The zeolites can be used in the pure form or they can be combined with a suitable support or binder. A silica alumina gel matrix containing the zeolite is a preferred form of catalyst.

The process of the invention is applicable to the alkylation of liquid aromatic compounds, particularly aromatic hydrocarbons. Specific examples of monocyclic aromatic hydrocarbons include benzene, toluene, ortho-xylene, para-xylene, meta-xylene, ethylbenzene, n-propylbenzene, iso-propylbenzene, hexylbenzene, nonylbenzene, dodecylbenzene and mixtures thereof. The process is also applicable to aromatic hydrocarbons containing two or more aryl groups such as diphenyl, diphenylmethane, fluorene and stilbene and to condensed ring aromatic hydrocarbons such as naphthalene and alkyl naphthalenes. Preferred aromatic hydrocarbons are benzene and monocyclic aromatic hydrocarbons containing 1–3 alkyl groups having 1–10 carbon atoms in the alkyl chain.

The alkylating agent can be an olefin hydrocarbon or a material which produces or acts as an olefin under reaction conditions. Thus, monoolefins, diolefins, polyolefins, alkyl halides, alcohols, ethers and esters can be used. The preferred alkylating agents are olefin hydrocarbons containing one double bond per molecule. Specific examples include ethylene, propylene, 1-butene, 2-butene, isobutylene, pentenes, hexenes, heptenes, propylene trimer, propylene tetramer and mixtures thereof. Olefins can also be obtained from refinery streams containing these olefins. Olefins containing 2–4 carbon atoms are the preferred alkylating agents.

The reaction is generally carried out in a stirred batch type, or fixed bed, reactor by contacting or passing the olefins and aromatics over the activated catalysts at temperatures ranging from ambient up to about 600° F., and preferably at from about ambient to the boiling point of the mixture, at atmospheric or subatmospheric pressures, and preferably at atmospheric or superatmospheric pressures, and preferably at autogenous pressure. The preferred pressure is 15 to 100 p.s.i.a. From about 0.1 to about 10, and preferably from about 0.5 to about 6, weight parts of olefin, per hour, per weight part of catalyst (w./hr./w.) is introduced into the reactor; and in introducing the aromatics and olefins into the reactor, molar ratios of aromatics:olefins ranging from 1:1 to about 15:1, and preferably from about 5:1 to about 10:1, are desired to minimize the reaction between the olefin, or olefins. Following operations, unreacted materials are recycled and the desired products are recovered.

The zeolite catalyst is activated for alkylation in the following general manner:

(A) The original synthetic or naturally occurring zeolite generally containing a considerable portion of alkali metal cations such as sodium is treated with an aqueous solution of an ammonium salt such as the nitrate or chloride in an appropriate manner to remove 50 to 98% of the alkali metal cations by exchange with the $NH_4^+$ ions. This treatment can be carried out by one or a number of successive exchange steps. Preferably, the exchange is conducted to remove 80 to 95% of the alkali metal cations. For example, with sodium faujasite a level of 2 to 5% $Na_2O$ is desirable.

(B) Following Step A, the material is heated in the presence of water vapor to elevated temperatures in the range of 600° to 1200° F. for periods of time ranging from 1 to 16 hours or more. In a preferred embodiment, the material from step A is heated in about 1 atmosphere of steam for about 2 hours at temperatures from 900° to 1100° F. Not all the processes that occur in this steaming step are fully understood. It is known, however, that $NH_3$ gas is liberated, leaving behind a hydrogen-form of the zeolite. More extensive changes also occur such as removal of physically absorbed water as well as partial removal of structural OH groups. The unit cell of the crystal generally is observed to decrease and the residual alkali metal ions are so rearranged as to make them more accessible to removal by further exchange. It is to be understood that although desirable, it may not be altogether necessary to add additional water for steaming since a portion of the water could result from residual water left in the filter cake after step A.

(C) After the steaming step, the zeolite is further treated with an ammonium salt solution as described in step A. The treatment is conducted in such a manner as to reduce the alkali metal content to a level of 0.02 to 1.0% by weight. Preferably, the level lies between 0.02 and 0.5%. One or more successive exchanges may be necessary to accomplish this removal. Ammonium salts are generally preferred for this exchange but it is also within the scope of this invention to include other agents such as mineral acids to accomplish this step. In a preferred embodiment, this final ammonium exchange is conducted at a pH of 3 to 5 which is kept in this range by addition of a mineral or acetic acid.

(D) The product from step C is then calcined in air at elevated temperatures to remove a considerable portion of the loosely held water and to liberate $NH_3$ by decomposing the $NH_4^+$ ions. This calcination is carried out at 700° to 1200° F. for periods of 1 to 16 hours or more. Preferably, the material is calcinated for 3 hours at 800° F.

The following examples demonstrate the superiority of the activated catalyst for alkylation of aromatic hydrocarbons.

EXAMPLE 1

$NH_4$ faujasite containing 2.97% $Na_2O$ was calcined in air for 3 hours at 1000° F. A portion weighing 1.178 g. was added to 10 cc. of research grade benzene. The mixture was stirred to a slurry at amibent temperature and propylene gas passed through at a rate of 50 cc./min. At various intervals the addition was stopped and a small sample withdrawn for gas chromatographic analysis. Results are given below in Table I where the percent alkylation represents the percent of alkylate in the liquid phase.

TABLE I

Propylene alkylation of benzene

| Time, hr.: | Percent alkylation per gram catalyst |
|---|---|
| 0.25 | 19.1 |
| 0.50 | 25.4 |
| 1.0 | 26.9 |
| 1.5 | 28.5 |
| 2.0 | 29.9 |

EXAMPLE 2

$NH_4$ faujasite containing 2.97% $Na_2O$ was steamed at one atmosphere pressure for 2 hours at 1050° F. This material was then exchanged with $NH_4NO_3$ solutions at a pH of 3 which was controlled by addition of acetic acid. The soda content of the resultant material was 0.31 weight percent. The faujasite was calcined for 3 hours at 1000° F. A portion weighing 1.0875 g. was added to 10 cc. of research grade benzene. The mixture was stirred to a slurry at ambient temperature and propylene gas passed through at a rate of 50 cc./min. At various intervals the addition was stopped and a small sample withdrawn for gas chromatographic analysis. Results are given below where the percent alkylation represents the percent alkylate in the liquid phase.

TABLE II

Propylene alkylation of benzene

| Time, hr.: | Percent alkylation per gram catalyst |
|---|---|
| 0.25 | 24.2 |
| 0.50 | 45.6 |
| 1.0 | 56.5 |
| 1.5 | 60.7 |
| 2.0 | 65.2 |

EXAMPLE 3

A sample of LaH faujasite (lanthanum hydrogen faujasite) containing 2.59% $Na_2O$ was calcined 3 hours in air at 1000° F. A portion weighing 1.1661 g. was added to 10 cc. of research grade benzene. The mixture was stirred to a slurry at ambient temperature and propylene gas passed through at a rate of 50 cc./min. At various intervals the addition was stopped and a small sample withdrawn for analysis. Results are given below where the percent alkylation represents the percent alkylate in the liquid phase.

TABLE III

Propylene alkylation of benzene

| Time, hr.: | Percent alkylation per gram catalyst |
|---|---|
| 0.25 | 23.9 |
| 0.50 | 28.8 |
| 1.00 | 30.8 |
| 1.50 | 34.0 |
| 2.00 | 39.0 |

EXAMPLE 4

$NH_4$ faujasite containing 2.97% $Na_2O$ was steamed at one atmosphere pressure for 2 hours at 1050° F. This material was then exchanged with $NH_4NO_3$ solution at a pH of 3 which was controlled by addition of acetic acid. The soda content of the resultant material was 0.31 weight percent. The zeolite was then further exchanged with $LaCl_3$ to produce a material containing 0.19% $Na_2O$. This was calcined for 3 hours in air at 1000° F. A portion weighing 1.1369 grams was added to 10 cc. of research grade benzene. The mixture was stirred to a slurry at ambient temperature and propylene gas passed through at a rate of 50 cc./min. At various intervals the addition was stopped and a small sample withdrawn for analysis. Results are shown below where the percent alkylation represents the percent alkylate in the liquid phase.

TABLE IV

Propylene alkylation of benzene

| Time, hr.: | Percent alkylation per gram catalyst |
|---|---|
| 0.25 | 22.4 |
| 0.50 | 43.9 |
| 1.00 | 54.1 |
| 1.50 | 58.2 |
| 2.0 | 64.5 |

Comparing Example 1 with Example 2, it can be seen that when the ammonium faujasite catalyst is steamed, reexchanged and calcined, 65.2% alkylate is produced compared to 29.9% when ammonium faujasite is merely calcined. Comparing Example 3 with Example 4, similar results are obtained with a rare earth faujasite.

Thus, the alkylation process disclosed and claimed herein provides the desirable feature of a solid alkylation catalyst capable of producing high yields of alkylated aromatics.

What is claimed is:

1. An alkylation process which comprises contacting an aromatic hydrocarbon with an olefin hydrocarbon under alkylation reaction conditions in the presence of an alkylation catalyst composition comprising a crystalline aluminosilicate zeolite which has been activated by the following sequential steps:
    (a) base exchange of a crystalline aluminosilicate zeolite having a pore size in the range of 5 to 15 A. with a solution of at least one ammonium salt so as to replace about 50 to 98% of the alkali metal content of said zeolite with ammonium cations;
    (b) heating the exchanged aluminosilicate material of step (a) in the presence of water vapor at temperatures in the range of about 600 to 1200° F.;
    (c) base exchange of the zeolite product of step (b) with a solution containing ions selected from the group consisting of ammonium cations, hydrogen ions and mixtures thereof so as to reduce the alkali metal content of said zeolite to a level of about 0.02 to 1.0% by weight; and
    (d) calcination in air of the zeolite product from step (c) at a temperature from about 700° to 1200° F.

2. A process according to claim 1 in which the aromatic hydrocarbon is benzene.

3. A process according to claim 1 in which the olefin is ethylene.

4. A process according to claim 1 in which the olefin is propylene.

5. A process according to claim 1 in which the alkylation reaction conditions include a temperautre below 600° F. and a pressure in the range of 15 to 100 p.s.i.a.

6. A process according to claim 1 in which the crystalline aluminosilicate zeolite is a synthetic faujasite.

7. A process according to claim 1 in which the crystalline aluminosilicate zeolite is combined with a silica-alumina gel matrix.

8. A process according to claim 1 in which the zeolite product of step (a) is heated in the presence of water vapor for 1 to 16 hours.

9. An alkylation process which comprises contacting a monocyclic aromatic hydrocarbon with a monoolefin containing 2 to 4 carbon atoms at a temperature below about 600° F. and a pressure in the range of 15 to 100 p.s.i.a. in the presence of an alkylation catalyst composition comprising a synthetic faujasite which has been activated by the following sequential steps:
(a) base exchange of the synthetic faujasite with a solution of at least one ammonium salt so as to replace 80 to 95% of the sodium cations of said faujasite with ammonium cations;
(b) heating the exchanged faujasite material of step (a) in the presence of water vapor to a temperature in the range of about 600 to 1200° F. for at least one hour;
(c) base exchange of the faujasite product of step (b) with a solution containing at least one ammonium salt so as to reduce the sodium content of said faujasite to a level of 0.02 to 1.0% by weight; and
(d) calcination in air of the faujasite product from step (c) at a temperature from about 700 to 1200° F. for at least one hour.

References Cited
UNITED STATES PATENTS

| | | | |
|---|---|---|---|
| 3,140,249 | 7/1964 | Plank et al. | 208—DIG. Z |
| 3,312,615 | 4/1967 | Cramer et al. | 252—455 Z |
| 3,375,064 | 3/1968 | Miale et al. | 208—DIG. Z |

CURTIS R. DAVIS, Primary Examiner

U.S. Cl. X.R.

252—455 Z